United States Patent
MacManus

[15] 3,659,519
[45] May 2, 1972

[54] APPARATUS FOR DEPOSITING AERATED FOOD PRODUCTS

[72] Inventor: John MacManus, 143-16-Twenty-second Road, Whitestone, N.Y. 11357

[22] Filed: Feb. 9, 1970

[21] Appl. No.: 9,666

[30] Foreign Application Priority Data

Feb. 13, 1969  Great Britain..........................7,981/69
Sept. 5, 1969  Great Britain........................44,031/69

[52] U.S. Cl..............................................99/450.1, 118/13
[51] Int. Cl......................................A21b 5/00, A21d 15/00
[58] Field of Search..................107/27 B, 28, 27 A, 1 R, 1 D, 107/52, 14, 31, 27 R, 54 H; 55/189, 310; 118/603, 610; 222/188, 108; 285/156, DIG. 16

[56] References Cited

UNITED STATES PATENTS 517,305  3/1894  Schueter..............................222/188
1,635,190  7/1927  Michallat..............................107/27 R
2,967,700  1/1961  Lee........................................261/140
2,956,522  10/1960  Young......................................107/31
3,285,202  11/1966  MacManus..........................107/54 H
3,358,424  12/1967  Magorien..................................55/189

FOREIGN PATENTS OR APPLICATIONS 193,217  1923  Great Britain..........................107/27

Primary Examiner—Henry C. Sutherland
Attorney—McCanna, Morsbach, Pillote & Muir

[57] ABSTRACT

A machine, utilizing static whipping discs, aerates a whippable food product. The aerated product is fed through a hose to a forcing bag. Venting apparatus is provided at the junction of the hose and bag to eliminate air voids. The method includes pumping the aerated product through a hose to a forcing bag, alternately compressing the bag to extrude the product and releasing the compression to interrupt the extrusion without interrupting the supply to the bag, and venting any air voids from the bag before the product reaches the tip of the bag.

12 Claims, 6 Drawing Figures

Patented May 2, 1972
3,659,519
2 Sheets-Sheet 1
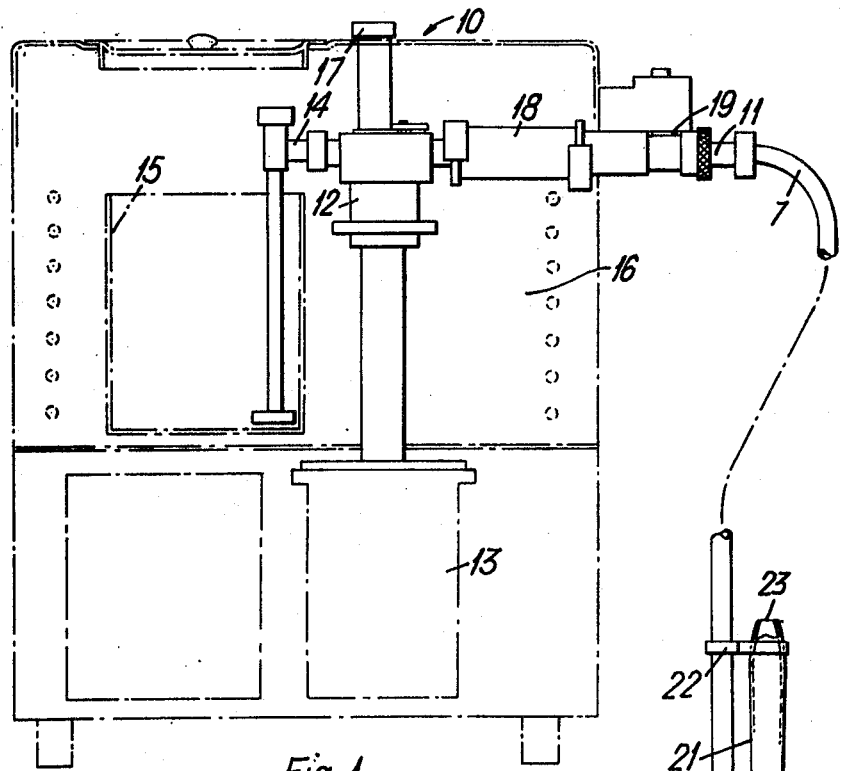
Fig.1.
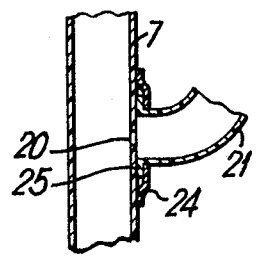
Fig.2.
Inventor
John McManus
By
McCanna, Morsback, Pillote & Mius
Attorneys Inventor
John MacManus
By
McCanna, Morsbach, Pillote + Muir
Attorneys

APPARATUS FOR DEPOSITING AERATED FOOD PRODUCTS

This invention relates to the art of handling relatively thick flowable material but particularly for products containing a high ratio of air to liquid and solids content. More particularly, this invention is herein described with reference to an improved method and apparatus for depositing a stiff fluent aerated food product on or into a succession of units of pastry, cakes, or other confectionery to decorate or fill them.

The aerated or whipped food product may be whipped cream, or imitation whipped cream and toppings formed from animal or vegetable fat creams. The term "depositing" of such a food product is meant to include placing a decorative topping on comestibles, such as pies, cakes, and the like; or injecting a filling into comestibles such as choux buns, eclairs, and the like.

One method of depositing a stiff fluent aerated food product, such as whipped cream, on or into a succession of units of pastry, cakes, or other confectionery to decorate or fill them is described in my U. S. Pat. No. 3,285,202, issued Nov. 15, 1966; which corresponds to Canadian Pat. No. 784,483, issued May 7, 1968. This method consists of pumping a continuing flow, that is a continuous or continual flow, of the product through a flexible hose to a collapsible forcing bag having an open discharge tip. The tip is moved over a unit to deposit the material on or into it in a prescribed pattern by alternately compressing the bag to cause it to collapse partially and reduce the capacity of the bag, so that the product is extruded from the tip, and then at least partially releasing the compression on the bag to interrupt the flow of material from the tip without interrupting the supply of material to the bag while moving the tip to the next unit, and so on.

In whipping animal or vegetable fat cream, air or gas is intermixed with the material to create an aerated food product having a high overrun. The amount of overrun depends, among other things, on the amount of gas intermixed. Ideally, the amount of gas introduced for intermixing would be the exact amount for the maximum overrun and the gas would be evenly disbursed throughout the whipped product. As in most things, the ideal is difficult to achieve. Since a deficiency of gas can cause an improperly whipped product, in which the product may "run" or "weep," it is safer to have an excess of gas. The intermixing then produces a whipped product having generally uniform stable gas bubbles and larger unstable gas pockets, or voids. Upon dispensing, the voids can cause spurting of the aerated product with accompanying destruction of designs and prior decorations. In the industry, a pastry or the like with such a ruined design is called a "cripple" and has little sales value.

However homogeneous the high overrun aerated product when pumped into the hose, there is inevitably a slight separation of the air resulting from compression of and within the product itself as the product passes through the hose enroute toward the bag. When the operation is a continuous one there is practically no hazard, but serious problems can arise when intermittent or interrupted flow of product occurs for any reason whatsoever; e.g. on interruption of the pumping machine for as little as a minute, large voids of air occur in irregular zones throughout the entire length of the hose. Also it must be noted that, the longer the machine stops, the more the voids and the greater is their resulting size. This trapped air will cause such great splittering of the product from the discharge tip of the bag when the air reaches the tip that the ratio of unsaleable to saleable goods is so great that the system is unacceptable.

To meet and solve this problem, in accordance with the present invention air voids separated from the product pumped along the hose are vented from the product before the product reaches the tip of the bag.

This may be achieved by apparatus comprising a flexible hose, one end of which is arranged to be connected to a source of product under pressure and the other end of which is connected to a collapsible forcing bag or pastry bag having an unobstructed discharge opening at its tip, wherein the wall of the bag, or of the hose, or of a coupling piece interconnecting the hose and bag is provided with a minute venting hole or holes leading outwards into an expansion space at atmospheric pressure.

With this arrangement any air which separates from the product and is entrapped between the different zones of the separated product as it passes along the hose and/or bag is able to escape immediately through the or each minute hole, which preferably has an effective length no more than twenty thousandths of an inch, and also, importantly to expand immediately to atmospheric pressure. The sudden expansion to atmospheric pressure prevents any product which passes through the hole from blocking the hole and preventing subsequent further venting.

Because of the high pressure at which the whole system must operate, however small the hole or holes consistent with their practicability, a small quantity of the product will inevitably escape and splatter with the air through the hole or holes. Preferably therefore the venting hole or holes lead into an expansion chamber which is at atmospheric pressure and which is arranged to contain any product escaping with the air.

The configuration and position of the chamber is arranged to prevent the escaped product from becoming a messy, unsanitary nuisance and the chamber preferably extends from the hole or holes in the upstream direction along the hose. Thus the expansion chamber may be an annular space formed between the inner and outer walls of a double walled hose. Preferably however the expansion chamber is provided by a flexible tubular skin one end of which is connected to the venting hole or holes and the other end of which is open to atmosphere. The use of the very thin flexible tube has the advantage that, during a long cycle of operation, the small amount of surplus product escaping into the tube can be easily removed from the tube for retrieval and reuse, or disposal, simply by squeezing the tube between the two fingers and drawing the fingers along the pliable tube to its free open end. In this way regular stoppages because of air locks and the resulting wastage is prevented and valuable time is saved and labor costs lessened.

Although the or each minute venting hole may be formed in the wall of the bag, it is preferably provided at or adjacent to the point where the downstream end of the hose leads into the bag. In this position it does not interfere with manipulation of the bag for controlled extrusion of the product and by the time the product has reached this point most of the air which it is so necessary to separate from the product will have done so and thus the spoiled, i.e. unsaleable, goods problem is eliminated.

The minute venting hole or holes, preferably leading into the expansion chamber, can be completely unobstructed but it or they may be associated with a valve mechanism such that the hole is always open but adjustable or only open when an air void reaches a position for venting. When the hose and bag are interconnected by means of a coupling piece having a body formed with a passage through which the product flows from the hose to the bag, the coupling piece forms a suitable mounting for the valve mechanism. Preferably then the venting hole or holes open from the passage in the coupling piece into a valve chamber formed in the body, the chamber containing the valve mechanism which is set by manipulation of an externally adjustable finger piece. The chamber must have an appreciable cross section so that the effective length of the venting hole or holes is small enough to prevent clogging by the product and to provide the important expansion of the escaping air as it passes through the hole or holes.

In order to ensure that no air voids passing through the coupling piece by-pass the venting hole or holes, the passage through the body is preferably elongated in cross section and the venting hole or holes open into a wider side of the passage. The product then passes the venting hole or holes as a thin film.

Some examples of apparatus constructed in accordance with the present invention are illustrated in the accompanying drawings in which:

3

FIG. 1 is a diagrammatic elevation, with parts in section, of one apparatus;

FIG. 2 is a detailed section of part of FIG. 1;

Figure 3:
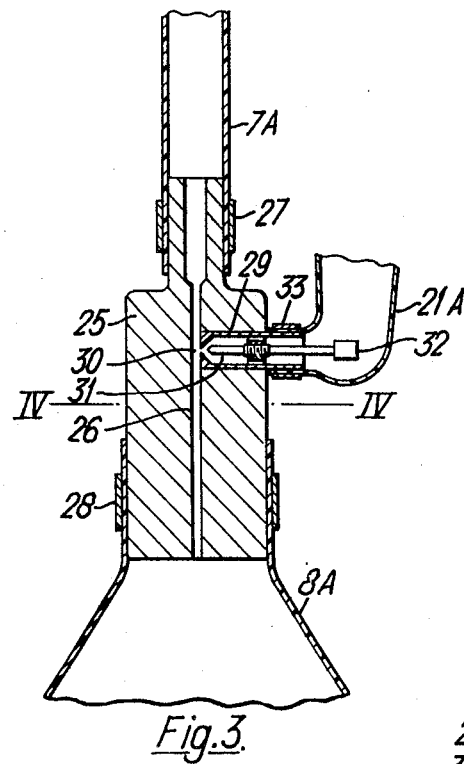
FIG. 3 is a detailed section of a coupling at hose and bag of another apparatus.

FIG. 1 shows a flexible hose 7 which is moulded integrally with a thin-walled, flexible and collapsible forcing bag or pastry bag 8 from translucent synthetic plastics material of suitable hygenic characteristics. The bag 8 is provided at its discharge tip with a star shaped outlet nozzle 9 which has an unobstructed discharge opening. The hose 7 is coupled at its upstream end to a product whipping and pumping machine 10 by means of a coupling 11.

The machine 10 has a pump 12, driven by a motor 13, the pump drawing in liquid product through an inlet 14 either from a container 15 in a refrigerated compartment 16 or from a remote bulk container (not shown) through a flexible pipe. Simultaneously with the sucking in of the liquid product, the pump sucks in air through an adjustable valve controlled by a rotatable plug 17 and the mixture of liquid product and air is pumped through a homogenizer 18 containing a series of static discs which provide a labyrinth of channels. The mixture is whipped into an emulsion product by the homogenizer 18 and passes through a solenoid operated shut off valve 19 to the machine outlet and hence through the coupling 11 to the hose 7.

Analogously to the method described in my above-mentioned patent, the aerated product is continuously or continually pumped by the machine 10 through the hose 7 into the bag 8 so that the bag 8 remains at least partially full of product. The product is extruded from nozzle 9 by periodically compressing the bag 8 to reduce its capacity and subsequently releasing the pressure thus allowing the bag to fill up without any product being extruded from the nozzle 9, while the nozzle is moved from confection to confection. In this way the pump 12 does not have to be operated in synchronism with the depositing of product from the nozzle 9. The bag 8 may be compressed manually as described in my above-mentioned patent or automatically, as desired.

The invention is concerned with the problem of any air voids separating from the product being pumped along the hose 7 due for example to a short stoppage. These air voids are automatically vented from the product through a minute hole 20 in the wall of the hose 7 adjacent to the bag 8. The hole 20 communicates with the interior of a thin flexible sausage skin like expansion chamber 21 which is held in position extending upstream alongside the hose 7 by means of a strap 22 and the other end 23 of which is open to atmosphere. The first end of the chamber 21 is secured to the hose 7 around the hole 20 by means of a pressure sensitive adhesive-coated annular washer 24 which overlaps an annular flange 25 at the end of the chamber 21 and clamps the flange against the wall of the hose 7.

The wall of the hose 7 may be between 4 and 16 thousandths of an inch thick, depending upon the material from which it is made, and its method of manufacture, and accordingly the effective length of the hole 20 is within the same range. Any air voids passing down the hose 7 are vented to the atmospheric pressure within the chamber 21 through the hole 20 and any worms of product inevitably escaping through the hole 20 with the air are also immediately expanded to atmospheric pressure and do not tend to clog the hole 20. These worms are contained within the chamber 21 and when necessary the chamber is released from the strap 22 and the expanded worms of product are extruded from the open end 23 by squeezing the chamber 21 adjacent to its lower end between two fingers and drawing the fingers along the chamber.

4

Although the preferred position for the hole 20 and chamber 21 are shown in full lines in FIG. 1, so that there is no obstruction to manual manipulation to the bag 8, the dotted positions 21A and 21B indicate possible alternative positions.

Figure 4:
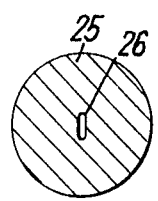
FIG. 4 is a section illustrating the cross section of the line IV—IV in FIG. 3.

FIG. 3 shows an example in which a hose 7A is coupled to a bag 8A by means of a moulded synthetic plastic coupling piece 25 having a product flow passage 26 extending from end to end through it. The downstream end of the hose 7A is clamped around a smaller diameter portion of the coupling piece 25 by means of a jubilee clip or other band 27 and the upstream neck of the bag 8A is clamped around the other larger diameter end of the coupling piece 25 by means of a band 28. A valve body 29 is sealed in a bore in the side wall of the coupling piece 25 and its inner end opens into the passageway 26 through a small venting hole 30. The hole 30 is formed in the center of a conical seating which cooperates with a needle closure member 31 which can be screwed towards or away from the seating to adjust the valve setting by means of an externally accessible fingerpiece 32. In use the fingerpiece 32 is adjusted to preset the valve and a flexible expansion chamber 21A, similar to the chamber 21 but secured in position by means of a band 33 which clamps the end of the chamber 21A around an extension of the valve body 29, may be provided. The part of the passage 26 extending through the larger diameter portion of the coupling piece 25 has an elongate cross section as shown in FIG. 4 so that the product passes the hole 30 as a thin film, making it difficult for any of the air voids to bypass the hole 30. Any air voids coming into alignment with the hole 30 are vented through the hole 30 and, together with any worms of product accompanying the air, are expanded within the body 29 and chamber 21A to atmospheric pressure. The hole 30 and the clearance between the seating and the closure member 31 are such that the effective length of the venting hole is less than 20 thousandth of an inch so that the air and worms of product are immediately expanded to atmospheric pressure.

Figure 5:
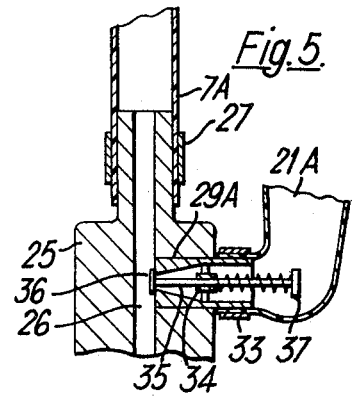
FIG. 5 is a view similar to part of FIG. 3 but of another apparatus.

FIG. 5 illustrates a modification of the FIG. 3 and 4 apparatus in which the valve body 29A contains a spider 34 which supports a spring-loaded plunger 35 having a mushroom valve head 36 at its inner end. In this example the operator manually opens the valve to allow an air void passing down the passage 26 to be expanded into the body 29A and chamber 21A by pressing a plunger head 37 so that the head 36 moves further into the passageway 26 and opens the valve. The wall of the chamber 21A is sufficiently flexible to enable the head 37 to be manipulated through the wall of the chamber 21A.

Figure 6:
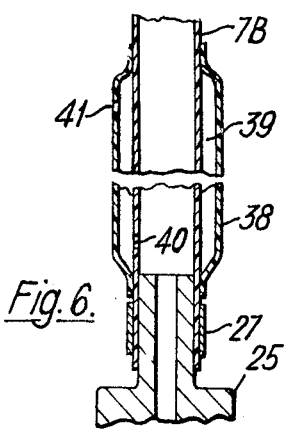
FIG. 6 is a detailed section of part of the hose and coupling piece of another apparatus.

In the example illustrated in FIG. 6, the hose 7B is provided over substantially its full length with an outer wall 38 so that the annular space 39 forming an expansion chamber is provided between the hose 7B proper, forming an inner wall, and the outer wall 38. The ends of the outer wall 38 may be heat welded to the inner wall 7B. Adjacent to the downstream end of of the hose, the inner wall 7B is provided with at least one small venting hole 40 through which air voids passing down the hose are automatically vented together with any worms of extruded product into the annular space 39 which is open to atmosphere through at least one hole 41 adjacent to the upstream end of the outer wall 38.

I claim the invention in which an exclusive property or privilege is claimed are defined as follows:

1. Apparatus for depositing an aerated food product on or into a succession of units of pastry, cakes, or other confectionery, comprising a collapsible forcing bag having a wall with an unobstructed discharge opening at one end, a flexible hose having a wall operatively connected to the forcing bag and communicating with the interior of the forcing bag, a coupling piece for interconnecting the hose and forcing bag, the coupling piece having a body formed with a passage through which the product flows from the hose to the forcing bag, a chamber formed in the body of the coupling piece, a pump operatively connected to the hose for pumping the product through the hose to the forcing bag, means in the coupling piece defining a minute venting hole opening from the passage into the chamber for venting any air voids to atmosphere before the air voids reach said discharge opening, a valve mechanism in the chamber for controlling the flow of air through the venting hole, and the valve mechanism including an externally adjustable finger piece which is manipulative for controlling the flow of air through the venting hole.

2. Apparatus according to claim 1, wherein the valve mechanism is spring-loaded to a position in which the venting hole is closed, and including a plunger having an outer extremity which forms the externally adjustable finger piece and which is selectively movable against the spring by pressing the plunger.

3. Apparatus according to claim 1 in which the passage through the body is elongate in cross-section, and the venting hole opens into a wider side of the passage.

4. In a whipping apparatus for whipping food products such as animal or vegetable fat creams and including storage means for holding a whippable food material, means for introducing a gas into the material, whipping means for intermixing the material and gas to produce a whipped product having generally uniform stable gas bubbles and larger unstable gas pockets therein, and means for providing a flow of the whipped product through a discharge opening, the improvement comprising: elongate wall means defining a flow passage having an inlet end communicating with the discharge opening for receiving the flow of whipped product, and an outlet end for dispensing the whipped product; the wall means having a venting hole therein located closer to the outlet end than the inlet end for venting the unstable gas pockets to atmosphere before the whipped product reaches the outlet end; a valve mechanism associated with the venting hole for selectively opening and closing the same to control the flow of the gas therethrough, the valve mechanism including a plunger having an outer extremity which forms an externally adjustable finger piece, the valve mechanism including spring means for urging the plunger to a closed position, and the plunger being movable against the spring by pressing the finger piece to open the valve and vent the unstable gas pockets to atmosphere; a flexible tubular skin defining an expansion chamber which is at atmospheric pressure and arranged to contain any product escaping with the air; and the flexible tubular skin having one end open to atmosphere and another end connected to the wall adjacent the venting hole so that the expansion chamber communicates with the venting hole.

5. Apparatus according to claim 4, wherein the venting hole has an effective length of no more than twenty thousandths of an inch.

6. Apparatus according to claim 4, wherein the elongate wall means includes a hose, and the expansion chamber extends from the venting hole in the upstream direction along the hose.

7. Apparatus for whipping food products such as animal or vegetable fat creams and including storage means for holding a whippable food material, means for introducing a gas into the material, whipping means for intermixing the material and gas to produce a whipped product having generally uniform stable gas bubbles and larger unstable gas pockets therein, and means for providing a flow of the whipped product through a discharge opening, the improvement comprising: an elongate wall defining a flow passage having an inlet end communicating with the discharge opening for receiving the flow of whipped product, and an outlet end for dispensing the whipped product; the wall having a venting hole formed by a puncture therein; the venting hole being located closer to the outlet end than the inlet end for venting the unstable gas pockets to atmosphere before the whipped product reaches the outlet end; a valve mechanism associated with the venting hole for selectively opening and closing the same to control the flow of the gas therethrough, the valve mechanism including a plunger having an outer extremity which forms an externally adjustable finger piece, the valve mechanism including spring means for urging the plunger to a closed position, and the plunger being movable against the spring by pressing the finger piece to open the valve and vent the unstable gas pockets to atmosphere; means defining an expansion chamber communicating with the venting hole and which is at atmospheric pressure and arranged to contain any product escaping with the air, the expansion chamber having a flange at the end adjacent the wall; and a washer which is bonded to the wall and traps the flange at the end of the expansion chamber against the wall to seal the expansion chamber to the wall.

8. Apparatus for depositing an aerated food product on or into a succession of units of pastry, cakes, or other confectionery, comprising a collapsible forcing bag having a wall with an unobstructed discharge opening at one end, a flexible double-walled hose having an inner wall connected to the forcing bag and communicating with the interior of the forcing bag, a pump operatively connected to the hose for pumping the product through the hose to the forcing bag, means in one of said walls defining a minute venting hole for venting any air voids to atmosphere before the air voids reach said discharge opening, an expansion chamber formed by the annular space between the inner and outer walls of the hose and communicating with the venting hole, and the expansion chamber being at atmospheric pressure and arranged to contain any product escaping with the air.

9. Apparatus for depositing an aerated food product on or into a succession of units of pastry, cakes, or other confectionery, comprising a collapsible forcing bag having a wall with an unobstructed discharge opening at one end, a flexible hose having a wall connected to the forcing bag and communicating with the interior of the forcing bag, a pump operatively connected to the hose for pumping the product through the hose to the forcing bag, means in one of said walls defining a minute venting hole for venting any air voids to atmosphere before the air voids reach said discharge opening, a flexible tubular skin defining an expansion chamber communicating with the venting hole and arranged to contain any product escaping with the vented air, the tubular skin having one end connected to the wall adjacent the venting hole and another end open to atmosphere, and the tubular skin extending from the venting hole in the upstream direction.

10. Apparatus according to claim 9 wherein the venting hole is formed by a puncture in one of the walls, and the tubular skin has a flange at its said one end; and including a washer which is bonded to the wall and traps the flange at the end of the tubular skin against the wall to seal it to the wall.

11. Apparatus according to claim 9, wherein the venting hole has an effective length of no more than twenty thousandths of an inch.

12. Apparatus according to claim 9 including a valve mechanism at the venting hole for controlling the flow of air escaping therethrough

* * * * *